United States Patent [19]

Shoemaker

[11] Patent Number: 5,073,969

[45] Date of Patent: Dec. 17, 1991

[54] MICROPROCESSOR BUS INTERFACE UNIT WHICH CHANGES SCHEDULED DATA TRANSFER INDICATIONS UPON SENSING CHANGE IN ENABLE SIGNALS BEFORE RECEIVING READY SIGNAL

[75] Inventor: Kenneth D. Shoemaker, Saratoga, Calif.

[73] Assignee: Intel Corporation, Santa Clara, Calif.

[21] Appl. No.: 227,078

[22] Filed: Aug. 1, 1988

[51] Int. Cl.[5] ............................................. G06F 3/00
[52] U.S. Cl. ............................ 395/725; 364/DIG. 1; 364/243.4; 364/927.93; 364/927.8; 364/DIG. 2
[58] Field of Search ... 364/200 MS File, 900 MS File

[56] References Cited

U.S. PATENT DOCUMENTS

| | | | |
|---|---|---|---|
| 4,079,451 | 3/1978 | Woods | 364/200 |
| 4,092,728 | 5/1978 | Balzer | 364/900 |
| 4,099,253 | 7/1978 | Dooley | 364/900 |
| 4,131,940 | 12/1978 | Moyer | 364/200 |
| 4,371,928 | 2/1983 | Barlow | 364/200 |
| 4,426,681 | 1/1984 | Bacot | 364/200 |
| 4,443,846 | 4/1984 | Adcock | 364/200 |
| 4,447,878 | 5/1984 | Kinnie | 364/200 |
| 4,507,731 | 3/1985 | Morrison | 364/200 |
| 4,633,437 | 12/1986 | Mothersole | 364/900 |
| 4,683,534 | 7/1987 | Tietjen | 364/200 |
| 4,716,527 | 12/1987 | Graciotti | 364/200 |
| 4,802,085 | 1/1989 | Levy | 364/200 |
| 4,816,997 | 3/1989 | Scales | 364/200 |
| 4,905,188 | 2/1990 | Chuang | 364/900 |
| 4,912,630 | 3/1990 | Cochcroft | 364/200 |
| 4,912,631 | 3/1990 | Lloyd | 364/200 |
| 4,920,483 | 4/1990 | Pogue | 364/200 |

FOREIGN PATENT DOCUMENTS

8600436 4/1985 European Pat. Off. .
0189638 10/1985 European Pat. Off. .
2075226 4/1981 United Kingdom .

Primary Examiner—Thomas C. Lee
Assistant Examiner—Eric Coleman
Attorney, Agent, or Firm—Blakely, Sokoloff, Taylor & Zafman

[57] ABSTRACT

A bus interface unit for a microprocessor which has an internal data bus of n bytes where n is greater than 2 for sensing and responding to enabling signals from external memory circuitry. The microprocessor provides address signals (31) for an n byte transfer (read or write) of data. Input pins receive at least one signal (byte size signal (34 or 35)) which indicates the number of bytes that the memory will transfer on the next ready signal. The microprocessor includes an output line for providing a last signal indicating that a data transfer request by the microprocessor will be satisfied with the data transfer occurring at the next ready signal. Logic circuit (44) is provided in the microprocessor for generating the last signal. This circuit (44) keeps track of the number of bytes that have been transferred, and it periodically senses the byte sizing signals (34 and 35). The logic circuit (44) is able to change the status of the last signal (29) "on the fly". Therefore, by way of example, the external memory can provide a particular byte size signal as a default condition, and then change the signal when the memory determines the number of bytes that the memory is actually able to transfer.

3 Claims, 5 Drawing Sheets

FIG_1

FIG__2

MICROPROCESSOR BUS INTERFACE UNIT WHICH CHANGES SCHEDULED DATA TRANSFER INDICATIONS UPON SENSING CHANGE IN ENABLE SIGNALS BEFORE RECEIVING READY SIGNAL

BACKGROUND OF THE INVENTION

1. Field of the Invention

The invention relates to the field of semiconductor microprocessors.

2. Prior Art

The present invention covers an interfacing unit forming part of a microprocessor which processor is an improved version of the Intel 80386 microprocessor, frequently referred to as the 386 processor. The 386 processor includes a 32-bit internal data bus; details of the bus for the 386 processor are described in numerous publications (Intel, 80386 and 386 are trademarks of Intel Corporation).

The 386 processor includes an on-chip memory management unit. This unit provides addressing to, for example, a cache memory, DRAMS, mass storage, etc. The processor described in this application additionally includes an on-chip cache memory as well as an on-chip floating point unit. Certain problems arise in transferring data to an on-chip cache memory and floating point unit which are better solved by the interfacing unit described in the present application. These problems involve the transfer of blocks of data such as those transferred to a cache memory or large words associated with the floating point unit.

It is not uncommon for a 16-bit or 32-bit microprocessor to be coupled to a memory or peripherals having fewer data lines. For example, a 32-bit processor may be coupled to a RAM which provides 8 bits (single bytes) of data during each memory cycle. In some cases, the processor includes a multiplexer which couples the external data lines to different "byte lanes" of the internal data bus. This, for example, allows the external memory to satisfy a processor request for a 32-bit data word with 8 bit transfers. Various signals indicating the bus size are used in prior art microprocessors. As will be seen, the present invention permits bus sizing to be done "on the fly". This capability, along with a dynamically determined "blast" (burst last) signal enhance the presently described microprocessor when compared to prior art processors.

Other prior art known to Applicant are the bus signals associated with the Multibus-including the Multibus II (Multibus is a trademark of Intel Corporation). Additionally, other prior art known to Applicant is shown in copending application, Ser. No. 006,353, filed Jan. 14, 1987 now U.S. Pat. No. 4,807,109, entitled "High Speed Local Bus and Data Transfer Method" (1024). The following prior art patents are known to Applicant: U.S. Pat. Nos. 4,570,220; 4,447,878; 4,442,484; 4,315,308; and, 4,315,310.

SUMMARY OF THE INVENTION

An improvement in a microprocessor which has an internal data bus of n bytes where n is greater than 2 (in the currently preferred embodiment, 32-bit bus) is described. The microprocessor provides address signals for an n byte transfer (read or write) of data. A first input means (e.g., input line or pin) receives at least one signal (byte size signal) which indicates the number of bytes that the memory will transfer on the next ready signal. The microprocessor includes an output means (e.g., line or pin) for providing a last (sometimes referred to as "blast") signal indicating that a data transfer request by microprocessor will be satisfied with the data transfer occurring at the next ready signal. Logic means are provided in the microprocessor for generating the last signal. This logic means keeps track of the number of bytes that have been transferred, and it periodically senses the byte sizing signal. The logic means is able to change the status of the last signal "on the fly". Therefore, by way of example, the external memory can provide a particular byte size signal as a default condition, and then change the signal when the memory determines the number of bytes that the memory is actually able to transfer. The last signal will change accordingly.

The last signal is also used in conjunction with the transfer of data to the cache memory when it is determined that the memory is seeking "cacheable" data from external memory. Such transfers can be made in a burst mode in response to a "B ready" signal from the memory. The B ready signal is also used by the logic means for generating the last signal.

Other aspects of the present invention are described in the detailed description of the invention.

DETAILED DESCRIPTION OF THE PRESENT INVENTION

A bus interface unit for a microprocessor is described. In the following description, numerous specific details are set forth, such as specific number of bytes, etc., in order to provide a thorough understanding of the present invention. It will be obvious, however, to one skilled in the art that the present invention may be practiced without these specific details. In other instances, well-known circuits have not been shown in detail in order not to unnecessarily obscure the present invention.

OVERALL BLOCK DIAGRAM OF THE MICROPROCESSOR

Figure 1:
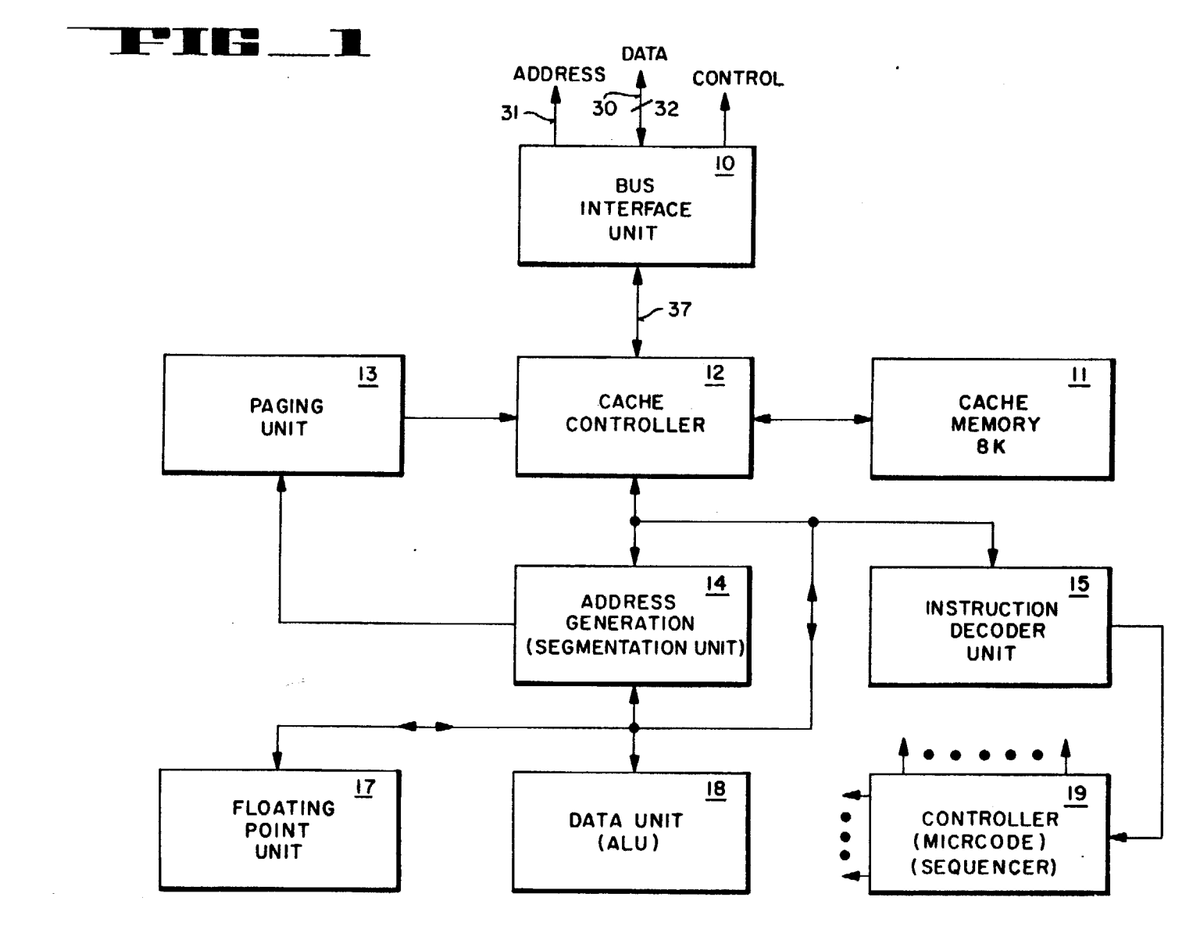
FIG. 1 is a general block diagram showing the various units that make up the microprocessor.

Referring to FIG. 1, the microprocessor in which the bus interface unit 10 of the present invention is used, is shown in general block diagram form. The interface unit 10 is coupled to a 32-bit external data bus 30 and additionally is coupled to an address bus 31 and several other control lines as will be described in conjunction with FIG. 2. (Note the term "data" is generally used to indicate information transferred over the data bus. This information may include instructions, constants, pointers, etc.) The interface unit 10 is coupled by address and data buses to a cache memory controller 12. Controller 12 controls the accessing of the cache memory 11. The controller 12 is coupled to the address generation unit 14; a paging unit 13 is also coupled between the address generation unit 14 and cache controller 12 via bus 37. For purposes of understanding the present invention, the address generation unit may be assumed to be the same as that used in the commercially available Intel 80386. The segmentation and paging units for the Intel 80386 are described in copending application, Ser. No. 744,389, filed June 13, 1985, entitled "Memory Management For Microprocessor", which is assigned to the assignee of the present invention.

For purposes of understanding the present invention, the specific configuration of a cache memory 11 and cache controller 12 are not important. Signal flow between the controller 12 and interface unit 10 insofar as needed to understand the present invention are described in conjunction with FIG. 2.

Within the microprocessor instructions are coupled to the instruction decoder unit 15. The decoder unit operates with a controller 19 in which microcode instructions are stored; the controller 19 provides sequences of control signals for the microprocessor. The instruction decoder unit 15 is shown coupled to controller 19; the outputs from the controller are coupled to all the other units of the microprocessor. The data unit 18 is an arithmetic logic unit (ALU) which performs ALU functions in a similar manner to those performed by the Intel 80386.

The microprocessor also includes a floating point unit 17 for performing floating point computations. The precise configuration of the unit 17 is not critical to the present invention although the block transfers required by the unit 17 and the cache memory 11 provided some of the impetus for the present invention.

The currently preferred embodiment of the microprocessor of FIG. 1 is realizable with known metal-oxide-semiconductor (MOS) technology and, in particular, with complementary MOS (CMOS) technology. Clock rates of 25 mHz or better are possible with current CMOS technology.

BLOCK DIAGRAM OF BUS INTERFACE UNIT

Figure 2:
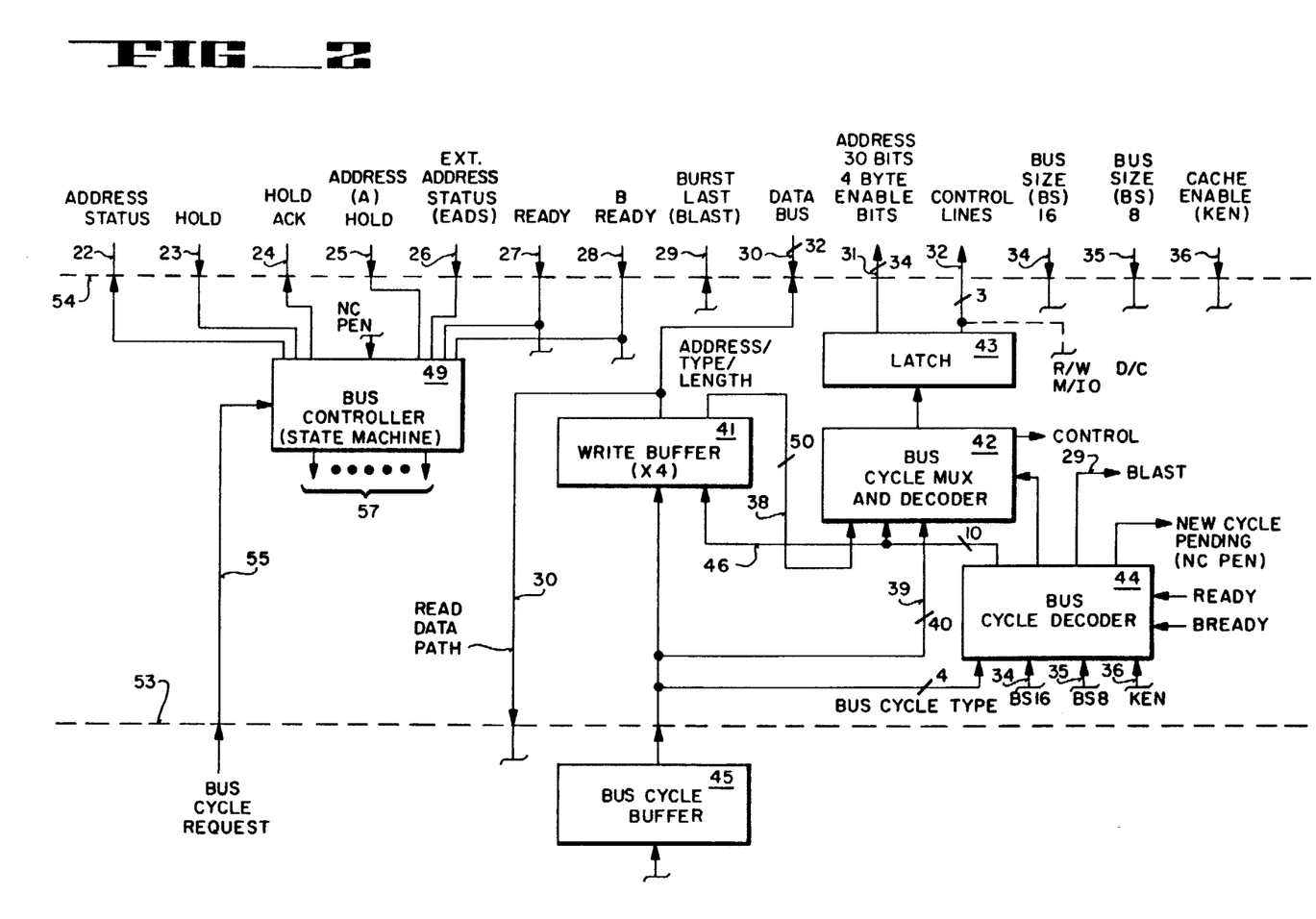
FIG. 2 is a block diagram of the invented bus interface unit.

The major components of the bus interface unit 10 of FIG. 1 are shown in FIG. 2 between the dotted lines 53 and 54. The cache controller 12 communicates with the interface unit 10 through the bus cycle buffer 45. All memory addresses, various control signals and all data to be entered into external memory are communicated to unit 10 through the buffer 45. Incoming data (read data path) is communicated directly to the cache controller 12 through the interface unit 10.

The output data of buffer 45 is coupled to the write buffer 41. This buffer is "4 deep", thus permitting data from buffer 45 for four CPU cycles to be temporarily stored in one of the four stages of the buffer 41. The output of the buffer 41 communicates directly with the data bus 30. Also stored in buffer 41 and associated with data stored in each of the four stages are signals representing the memory address, memory cycle type and length. The signals representing bus cycle type, etc., are coupled from the decoder 44 via lines 46 to the buffer 41 and to the bus cycle multiplexer and decoder 42.

The bus cycle multiplexer and decoder 42 selects either the address signals, bus type signals, etc. (i) from the buffer 41 (lines 38) or, (ii) directly from the buffer 45 (lines 39) and lines 46. The output of multiplexer and decoder 42 is coupled to the latch 43. The output of the latch provides the address signals (30 bits of address and 4 bits (byte enable signals)) on bus 31 and control lines for the memory on lines 32.

Four bits from the buffer 45 are coupled to the bus cycle decoder 44 to indicate the type of bus cycle. These bits indicate up to 16 different types of bus cycles, such as memory read, memory write, I/O read/write, prefetch, branch, locked read, locked write, write not finished, in-circuit emulator (read or write), and read and write to paging unit 13. The bus cycle type bits are decoded in decoder 44 and used to control, for example, the multiplexer 42, and to provide certain outputs such as the "blast" signal which shall be discussed.

The bus controller 49 receives a bus cycle request signal on line 55 in addition to several other inputs which shall be described. The bus controller provides control signals on lines 57 to the various circuits in the bus interface unit 10 including the bus cycle decoder 44, bus cycle multiplexer and decoder 42, latch 43 and buffer 41. The bus controller operates as an ordinary state machine.

The bus cycle decoder 44 provides the blast signal (*burst last*, sometimes referred to as the last signal). This signal (active low) indicates that a microprocessor data request (input or output) will be satisfied at the next ready signal on lines 27 or 28. The generation of this signal and its use including its interaction with the cache enable signal (KEN) on line 36 shall be discussed later in this application.

INPUTS TO AND OUTPUTS FROM THE BUS INTERFACE UNIT 10

The major external inputs to the bus interface unit and the major outputs (to external circuitry) from the unit 10 are shown in FIG. 2 along line 54. The data bus 30 is a 32-bit bidirectional bus. As will be discussed in conjunction with FIG. 3, all 32 lines of this bus typically require a connection to external circuitry. The microprocessor provides a memory address on the address bus 31. This address consists of 30 bits of address signals and four byte enable bits which shall be discussed in more detail in conjunction with FIG. 3. The three memory control lines 32 indicate read/write to memory, input/output an data vs. control (for example, prefetch from memory vs. data read). The address status (ADS) is an active low signal on line 22 indicating that the address on bus 31 is valid.

Figure 3:
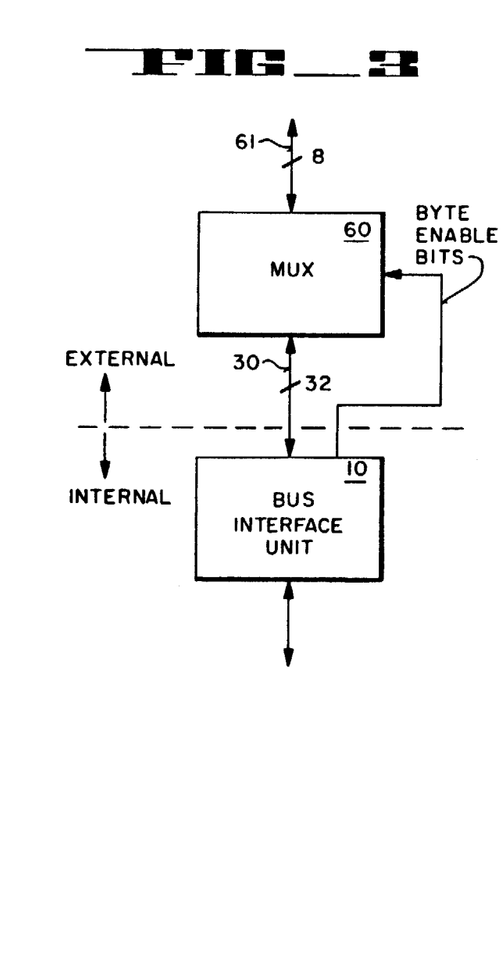
FIG. 3 is a block diagram illustrating the manner in which the 32 bits of the interface unit is coupled to an 8 bit external bus.

The memory cycle requests by the microprocessor generally require 32 bits of data read from memory or written to memory (larger transfers such as those associated with a cache memory are discussed later). In some cases, the memory may be limited to an 8-bit or 16-bit bus. If this is the case, the memory provides an appropriate signal on lines 34 or 35. The signal on line 35 (bus size 8) indicates that the transfer will be satisfied with eight bit transfers whereas the signal on line 34 (bus size 16) indicates that the request will be satisfied with 16 bit transfers. Lines 34 and 35 are coupled to the bus cycle decoder 44 and their use particularly for the generation of the blast signal on line 29 shall be discussed later in the application.

As mentioned, the microprocessor includes an on-chip cache memory. Certain data is designated for storage within the cache memory. External circuitry examines addresses from the microprocessor and determines if a particular address falls within address space designated for storage within the cache memory. This is generally done for instructions, constants, etc., and not done for data which is shared. If external circuitry determines that the data requested is "cacheable" that is, it should be stored in the cache memory, then the KEN signal is returned (active low) on line 36. This signal is coupled to the decoder 44 and as will be described is used in generating the blast signal.

The input on line 23 is an ordinary "hold" signal and the output on line 24 is a hold acknowledge. The input signal on line 25 (address hold) indicates that the external bus is to be immediately floated. This is done to prevent system deadlock with other equipment on the bus. Line 26 provides an external address status. Lines 27 and 28 receive a ready signal and a "burst" ready signal, respectively. These signals are also coupled to the bus cycle decoder 44 and their use in generating the blast signal shall be discussed later.

DATA BUS INTERFACE

In some microprocessors an internal data bus of, for example, 32 bits may be coupled directly to an external data bus having fewer lines. In the case of the Intel 80386, for instance, an 8-bit data bus may be directly connected to the lower 8 lines/bits of that microprocessor's internal data bus. Signals are applied to the microprocessor to indicate that only the lower 8 lines of the data bus are in use. Most often, the microprocessor includes an internal multiplexer which allows the external 8 data bus lines to be selectively coupled to the four bytes lanes of the internal data bus.

With the currently preferred embodiment of the invented microprocessor all 32 bits of the internal data bus must be connected to an external bus. Where the external data bus is only 8 or 16 lines/bits wide, an external multiplexer such as multiplexer 60 of FIG. 3 enables the 8 or 16 lines of the external data bus to be selectively coupled to any of the byte lanes of the internal data bus. This is simply shown in FIG. 3 (for the case of an 8 bit external bus) by the 32 lines of the data bus of the bus interface unit 10 being coupled directly to the multiplexer 60. The multiplexer 60 couples the 8 bit bus 61 to any one of the four byte lanes of bus 30. Byte enable bits are provided by the microprocessor to control the multiplexer 60. Thus, the microprocessor dictates which byte lane of its internal bus are to be coupled to the external data bus. As mentioned, in some prior art microprocessors, a circuit equivalent to multiplexer 60 is included on chip. All signals on the data bus are therefore coupled through this multiplexer when the multiplexer is on chip. There is a delay through the multiplexer and hence, all incoming and outgoing signals are delayed by the multiplexer when the multiplexer is on chip. Accordingly, even where a 32-bit external data bus is used, a delay occurs through the multiplexer. This penalizes the applications that are most likely to provide the highest performance. With the interface unit of the present invention, the multiplexer 60 is not needed where the bus interface unit 10 is connected to a 32-bit data bus. This provides higher performance when the 32-bit external bus is used.

BURST LAST (BLAST) SIGNAL

The blast signal on line 29 (active low) indicates that on the next ready signal (either lines 27 or line 28) a memory request by the CPU will be satisfied. This is particularly useful where data is transferred to the memory in words of less than 32 bits; during burst cycles where, for example, blocks of data are being transferred into the cache memory; or where words of greater than 32 bits in length are being transferred for the floating point unit. The blast signal can be used in various ways. It can be used to provide a "lock" to prevent reading or writing into a memory or memory space being accessed by the microprocessor. Such locks will prevent, by way of example, a portion of a data block of related data from being disturbed while it is being read into the microprocessor.

Importantly, as will be described, the blast signal can change state "on the fly". The signals which determine the state of the blast signal such as BS8, BS16 and KEN signal are periodically sampled and the state of the blast signal is redetermined with each such sampling. Thus, an external memory in a default mode may provide BS8 or BS16 active upon receiving an address from the microprocessor and at a later time determine it can make 8 bit, 16 bit or 32 bit transfers. The blast signal, as will be seen, can change states several times before a ready signal is returned.

Figure 4:
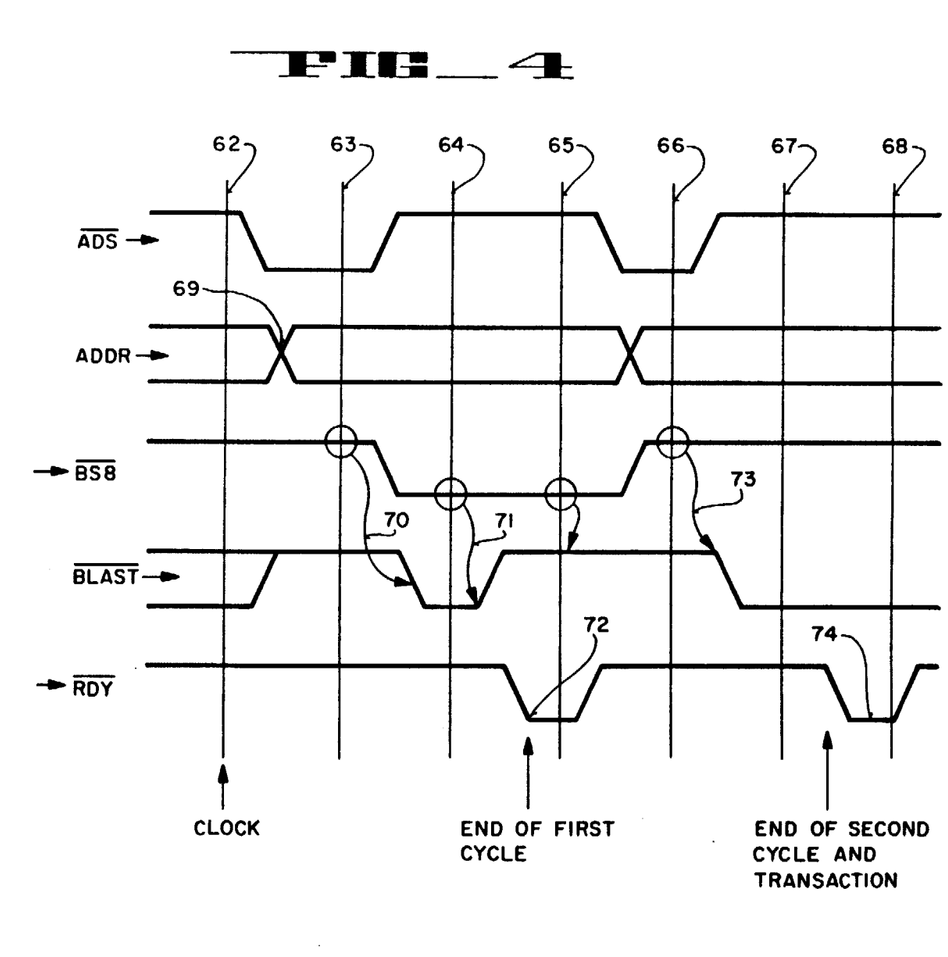
FIG. 4 illustrates waveforms used to describe the operation of the bus interface unit.

Referring to FIG. 4, the operation of the blast signal for an ordinary request for memory access by the microprocessor is illustrated. The vertical lines 62–68 represent the times at which internal clocking signals occur (e.g., 25 mHz). The waveform for ADS indicates that after time 62 the microprocessor provides a signal (valid low) on line 22 indicating that a new address is present on the address bus 31. The address signals are shown with the new address signals becoming valid as indicated by the transitions 69.

Assume that the external memory upon receiving the ADS signal and addresses determines that it will fill the 32 bit request from the microprocessor with 8 bit transfers. It does this by bringing low the BS8 signal. This is shown occurring after time 63. At time 63, however, the BS8 signal is examined by the microprocessor and is found to be high (assume the BS16 signal is high). The sensing of the BS8 and BS16 high at times 63 indicates that the full 32 bits will be transferred at the next ready thus satisfying in one cycle the request from the microprocessor. For this condition, this blast signal is driven low as indicated by arrow 70. Now at time 64 the BS8 signal is again examined and this time determined to be low. The microprocessor interprets this as meaning that an 8 bit transfer will occur and therefore only 8 bits of 32 bits requested will be transferred on the next ready signal. Therefore, additional memory cycles will be needed to complete the pending request of the microprocessor. As indicated by arrow 71, the blast signal is driven high to indicate that more memory cycles will be needed after the next memory cycle to complete the pending request of the microprocessor. Shortly after this occurs, the ready signal appears as indicated by the pulse 72. With this pulse, 8 bits of data are transferred between the microprocessor and memory, leaving 24 bits to be transferred to complete the pending request for the microprocessor.

After the first transfer occurs, the BS8 signal (between times 65 and 66) goes inactive (again assume that the BS16 signal remains inactive). This indicates that the memory is more able to accommodate a 32-bit transfer. At time 66 the state of the BS8 signal is sensed and the microprocessor interprets this to mean that on the next memory cycle, 24 bits are to be transferred and the pending request satisfied. The blast signal now goes active as indicated by arrow 73. On the next ready signal the 24 bits of data are transferred completing the second memory cycle and the transaction.

It should be noted from FIG. 4 that the blast signal changed state more than once during the pendency of the request from the microprocessor and indeed, the blast signal can change stage any number of times before ready is returned. This permits maximum flexibility for the types of transfers that can occur between the microprocessor and memory.

For the discussion of FIG. 4, the state of the byte enable signals has not been described. These signals will be described in more detail for the examples set out in FIG. 5. However, in general, once the BS8 or BS16 signals go active, the byte enable signals determine which byte lanes are used when the 8 bits are returned. In some cases, the byte enable signals are coupled to a MUX 60 such as shown in FIG. 3 or coupled to other external circuitry which directs signal coupling to the byte lane or lanes indicated by the byte enable signals.

BLAST SIGNAL GENERATION

The blast signal on line 29 is generated by the bus cycle decoder 44. In its presently preferred embodiment, this decoder is realized as a logic array. The portion of the array which generates the blast signal is best described by the equations which it implements. These equations can be readily converted into logic circuits (e.g., gates, etc.).

In the following equations "." represents a logical AND and a "+", a logical OR. The "#" symbol indicates the converse of a function, specifically breset# indicates that b-reset condition is not true. The various bus states are represented by t1 (indicating the microprocessor is sending out a new address), t2 (indicating that the microprocessor is looking for data), and $t_i$ (an idle state). "Firstfill" indicates the first bus cycle in a cache memory fill (e.g., first 4 bytes of 16 bytes are being transferred into the cache memory); the KEN signal is sampled active for firstfill. BS8 and BS16 refer to the signals on lines 35 and 34, respectively. "ncnt" means the number of bytes left to satisfy a microprocessor request. In the circuit this count is represented by a 5-bit field. In the equations below, the bits in this field are shown between brackets. If, for example, the brackets indicate "<1--->" the conditions of the field are met for the equation (that is, the term is true) if the first bit in the field is a binary one. The dash in the field indicates that the state of the bit does not matter insofar as meeting the conditions of the bracket.

For purposes of understanding the present invention, and particularly for the understanding of the blast signal, it can be assumed that the blast signal is the same as the morecyc. In fact, there are some differences for cycles other than ordinary memory cycles, for instance, for a boundary scan cycle the blast signal is not asserted. These diferences, however, are not important for an understanding of the preferred embodiment of the present invention.

Figure 6:
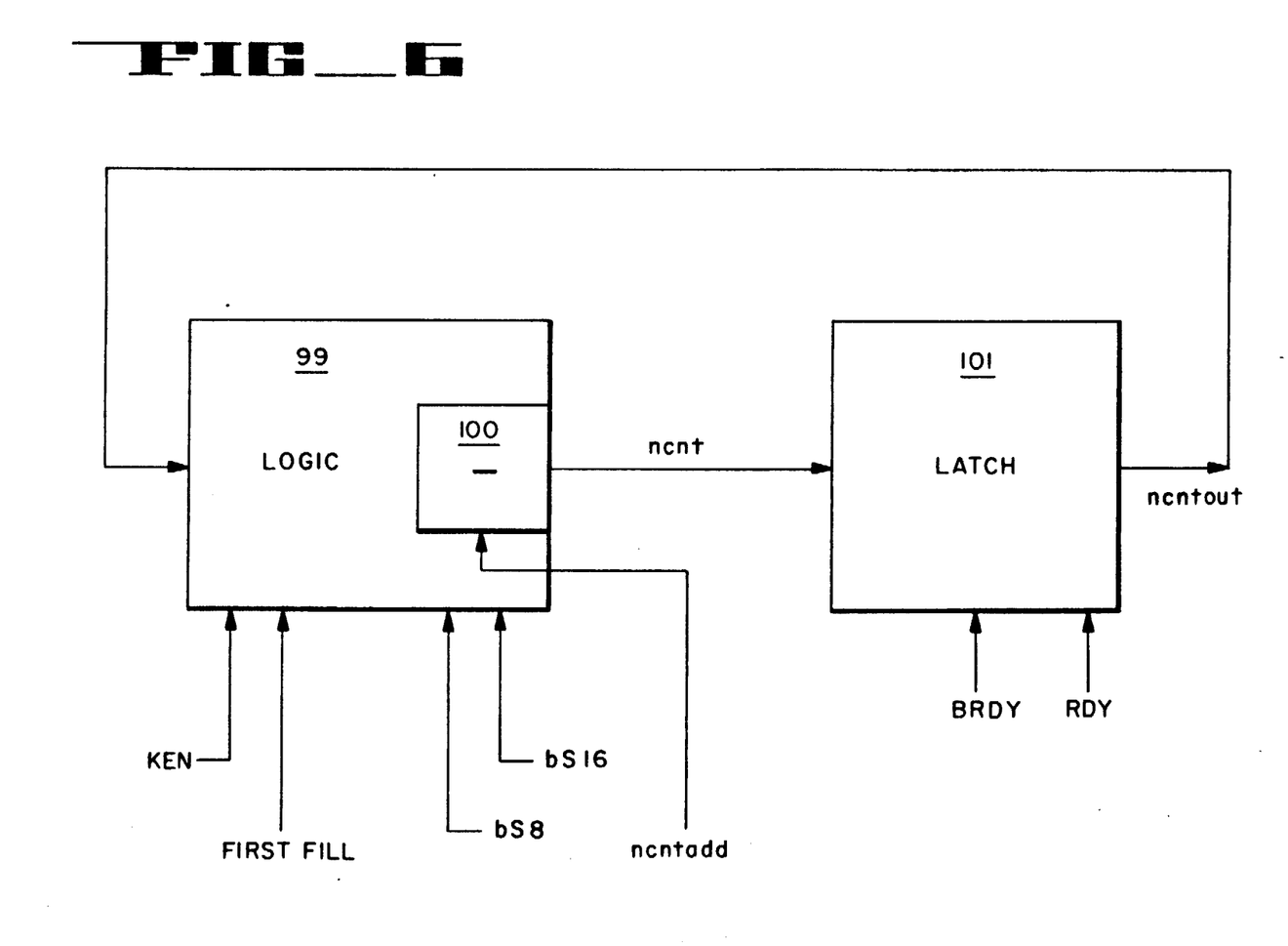
FIG. 6 is a block diagram representation of logic implemented in a gate array. This drawing is used in explaining the operation of the circuitry that generates the BLAST signal.

"ncntadd" indicates the number of bits to be subtracted for a particular transfer when ready is returned. "ncntadd" is a 3 bit field comprised of a concatenation of ncntadd2, ncntadd1 and ncntadd0. If, for example, ncntout is <10000> (16) and ncntadd is <001> (1) then ncnt becomes <01111> (15). This operation is shown in FIG. 6. The logic implemented by the equation is generally shown by logic 99. The substation is performed by subtractor 100. The BRDY or RDY signal causes latch 101 to capture the subtraction of ncntout from ncntadd to provide the new ncnt. This new value of ncnt is used to determine the state of morecyc.

"a1out" and "a0out" represents the actual address "1" address "0" for the bus cycle.

```
morecyc = breset#.(ncnt<1----->
          +ncnt<01--->
          +ncnt<0011->
          +ncnt<001-1>
          +ncnt<001--->.bs16
          +ncnt<001--->.bs8
          +ncnt<00011>.bs16
          +ncnt<0001->.bs8
          +ncnt<001--->.T2#
          +ncnt<00-1->.T2#
          +ncnt<00--1>.T2#
          +firstfill.T2);
ncntadd0 = T2.(bs8
          + (a0123<-1>.firstfill#));           [1 or 3 bytes]
ncntadd1 = T2.(bs16.bs8#.(a0123<-0>+firstfill))  [2 or 3 bytes]
          +(a0123<10>.bs8#+a0123<01>.bs8#.bs16#)).firstfill#);
ncntadd2 = T2.bs8#.bs16#.(a0123<00>+firstfill);   [4 bytes]
ncntout4 = firstfill + ncnt<1----->;
ncntout3 = firstfill#.ncnt<-1--->;
ncntout2 = firstfill#.ncnt<--1-->;
ncntout1 = firstfill#.ncnt<---1->;
ncntout0 = firstfill#.ncnt<----1>;
a1out = firstfill#.a0123<1->
a0out = firstfill#.a0123<-1>;
```

A TYPICAL MEMORY CYCLE

Figure 5:
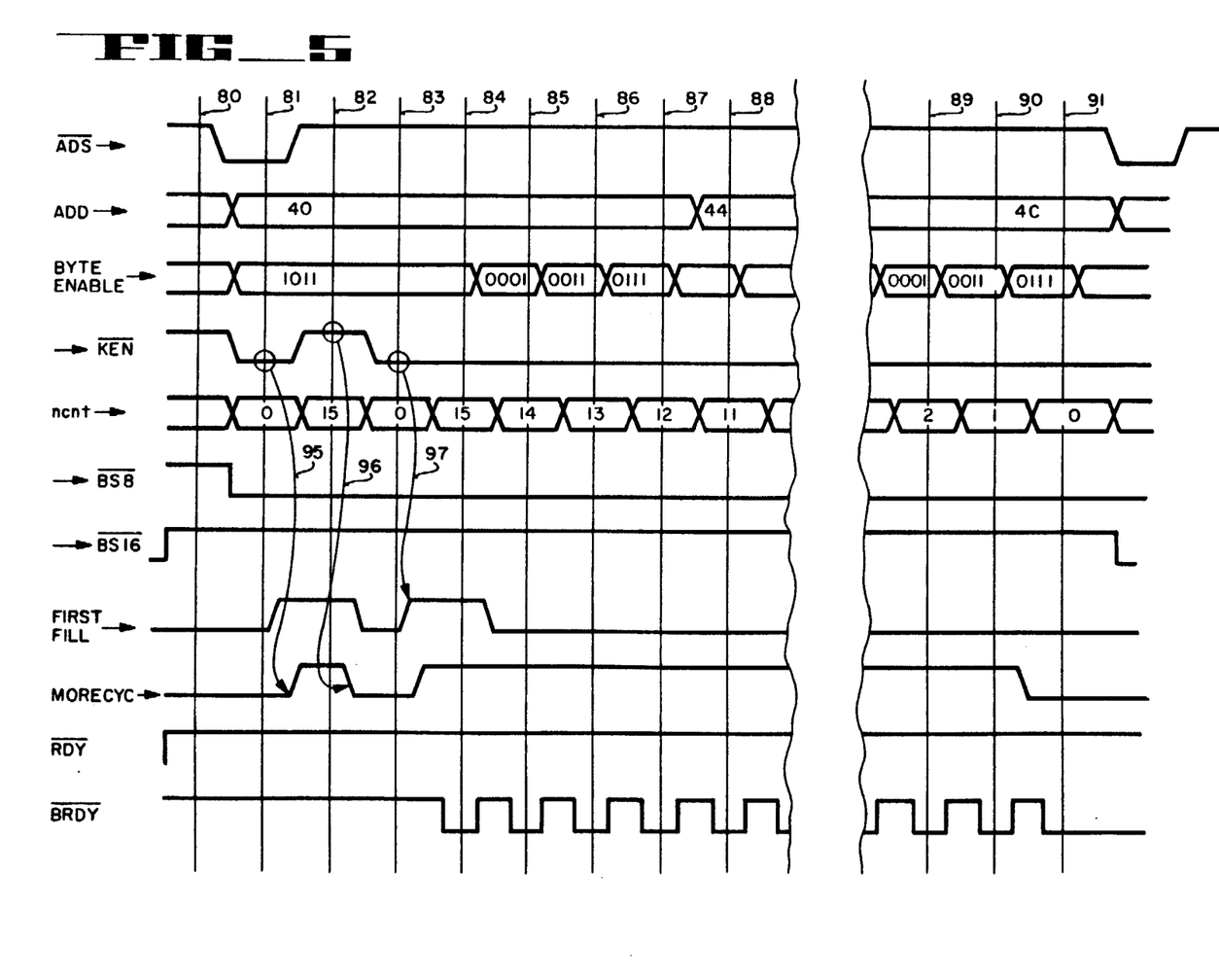
FIG. 5 illustrates waveforms used to describe the operation of the bus interface unit.

Referring now to FIG. 5, waveforms for the signals discussed above are shown for a data transfer. The vertical lines 80-91 represent time. For purposes of discussion, it is assumed that the KEN signal is sampled at the times represented by these vertical lines.

At time 80, no address is presented, hence, the processor is not requesting data. MORECYC is low for this condition. Between times 80 and 81, the ADS signal drops in potential indicating that an address is present. The address 40 is shown as being presented on the address lines. The byte enable signals are assumed to present the signals 1011. This indicates that the processor is seeking a single byte by this memory request. (If a typical 32 bit transfer is requested the byte enable signals are 0000.) Also, between times 80 and 81, the BS8 signal goes active, indicating that the memory will fill the request with 8 bit transfers; and the KEN signal goes active, indicating that data sought is cacheable.

At time 81 the KEN signal is sensed active and as indicated by the line 95, FIRST FILL goes active— since the next transfer is the first in a cacheable cycle. Referring to the equations above, the conditions for ncntout 4 are met since FIRST FILL is high. ncntout 3, 2, 1 and 0 are all low since FIRST FILL is high. Also the conditions for ncntadd0 are met since BS8 is active and the processor is seeking data. Examining the subtractor of FIG. 6 at this point in time: ncntout is <10000> (16); ncntadd is <001> (1), therefore, ncnt is equal to <01111> (15). Again, referring to the equations above, ncnt<01---> is valid, therefore MORECYC will be active. MORECYC is shown going active between the times 81 and 82 in FIG. 5.

Now at time 82 KEN signal is returned inactive. (The specific memory condition which may cause this unimportant, KEN signal is made inactive at this point to show the flexibility of the invented system.) When KEN signal is sampled inactive at time 82, FIRST FILL drops in potential as indicated by line 96. Once this occurs, the inputs to the subtractor of FIG. 6 are both ones, and ncnt is <00000>. None of the terms of MORECYC are met and the MORECYC potential drops. This indicates that on the next transfer the outstanding 8 bit request by the microprocessor will be satisfied. (Note that the microprocessor is only requesting 8 bits of data since a byte enable signal is 1011 and therefore this request can be satisfied even though BS8 is active.)

Between the times 82 and 83 the KEN signal again goes active. At time 83 this signal is sampled and as is indicated by line 97 FIRST FILL rises in potential. For this condition, ncnt becomes 15 and MORECYC rises in potential to indicate that on the next transfer the outstanding request of the processor will not be met. Between times 83 and 84 BRDY drops in potential and a transfer occurs (in effect, the 1011 byte enable signals are ignored since KEN signal was returned, and as indicated the byte enable signals subsequently cycle in an orderly manner as the data is transferred byte-by-byte).

After the first transfer occurs (and after time 84) the KEN signal remains low and FIRST FILL drops in potential since the first transfer of the burst cycle has been completed.

At times 85 to 91 each time BRDY goes active, another 8 bits are transferred and ncnt drops in value by "one" for each transfer. At time 90 the inputs to the subtractor are both "ones" and no term of MORECYC is satisfied. The MORECYC signal then goes inactive to indicate that on the next transfer the request by the memory is satisfied.

Thus, an interface unit for a microprocessor has been disclosed. The unit provides dynamic "on the fly" handling of signals affecting transfer, such as byte size and cache enable signal.

I claim:

1. In a microprocessor having an internal data bus of n bytes, where n is greater than 2, said microprocessor for providing address signals or an n byte transfer of data and for receiving a ready signal when external memory is ready to transfer data, said microprocessor also including a cache memory, an improvement is said microprocessor comprising:
   a first input means for receiving at least one byte size signal representing the number of bytes said external memory will transfer with said microprocessor on said next ready signal;
   output means for providing a last signal representing that a data transfer request by said microprocessor will be satisfied with the data transfer occurring at the next ready signal;
   logic means for generating said last signal, coupled to said first input means and to said output means, said logic means for keeping track of the number of bytes of data transferred after said microprocessor provides said address signals and for periodically sensing said size signal, said logic means being able to change said last signal with each sensed change of said sized signal for said ready signal;
   a second input means for receiving a cache enable signal generated externally to said microprocessor which indicates if data sought to be transferred to said microprocessor by said address signals is to be stored in said cache memory;
   wherein said cache enable signal is coupled to said logic means and is periodically sensed and used for generating said last signal, said logic means being able to change said last signal with each sensed change of said cache enable signal for said ready signal; and
   wherein said microprocessor further comprises a third input means for receiving a burst ready signal which indicates that said external memory is ready to transfer bursts of data in response to said address signals, said burst signal being coupled to said logic means and used for generating said last signal.

2. In a microprocessor having an internal 32-data bus, said microprocessor for providing address signals for the transfer of 32 bytes of data and for receiving a ready signal an external memory is ready to transfer data, said microprocessor also including a cache memory and a means for performing floating point calculations, an improvement in said microprocessor comprising:
   a first line for receiving an input signal indicating that said external memory will transfer 8 bytes of data, a second line for receiving an input signal indicating that said external memory will transfer 16 bytes of data, a third line for providing a least signal representing that a data transfer request by said microprocessor will be satisfied with a data transfer occurring at the next ready signal;
   logic means for generating said last signal, coupled to said first, second and third lines, said logic means keeping track of the number bytes of data transferred after said microprocessor provides said address signal and for periodically sensing such signals on said first and second lines, said logic means being able to change said last signal before said ready signal with each sensed change on said first and second lines;
   a fourth line which receives an input signal indicating whether data sought to be transferred to said microprocessor is to be stored within said cache memory (cache enable signal), said fourth line being coupled to said logic means, said cache enable signal being periodically sensed for use by said logic means for generating said last signal, said logic means being able to change said last signal before said ready signal with each sensed change of said cache enable signal;
   a fifth line for receiving an input signal indicating that said external memory is ready for a burst mode transfer data, said fourth line being coupled to said logic means and used for the generation of said last signal.

3. The improvement defined by claim 2 when said microprocessor further comprises a means for generating byte enable signals in response to signals on said first and second lines to indicate that byte lanes of said data bus which are to be used for the data transfer.

* * * * *

UNITED STATES PATENT AND TRADEMARK OFFICE
CERTIFICATE OF CORRECTION

PATENT NO.   :   5,073,969
DATED        :   December 17, 1991
INVENTOR(S)  :   Kenneth D. Shoemaker It is certified that error appears in the above-identified patent and that said Letters Patent is hereby corrected as shown below:

Column 8, line 63, after "this" insert --is--.

Claim 1, lines 2 - 3 (Column 9, line 39), "or" should be --for--.

Claim 1, line 6 (Column 9, line 42), "is" should be --in--.

Claim 1, line 8 (Column 9, line 44), after "one" delete --byte--.

Claim 1, line 23 (Column 9, line 59), "sized" should be --size--.

Claim 1, line 23 (Column 9, line 59), "for" should be --before--.

Claim 1, line 33 (Column 10, line 8), "for" should be --before--.

Claim 2, line 1 (Column 10, line 16), "32-data" should be --32-bit data--.

Claim 2, line 3 (Column 10, line 18), "bytes" should be --bits--.

Claim 2, line 4 (Column 10, line 19), "an" should be --when--.

Claim 2, line 9 (Column 10, line 24), "bytes" should be --bits--.

Claim 2, line 11 (Column 10, line 26), "bytes" should be --bits--.

Claim 2, line 18 (Column 10, line 33), after "number" insert --of--.

Claim 2, line 19 (Column 10, line 36), "such" should be --said--.

Claim 3, line 1 (Column 10, line 56), "when" should be --wherein--.

Claim 3, line 4 (Column 10, line 59), "that" should be --the--.

UNITED STATES PATENT AND TRADEMARK OFFICE
CERTIFICATE OF CORRECTION

PATENT NO. : 5,073,969

DATED : December 17, 1991

INVENTOR(S) : Kenneth D. Shoemaker

It is certified that error appears in the above-identified patent and that said Letters Patent is hereby corrected as shown below:

Claim 2, line 12 (Column 10, line 27), least" should be --last--.

Signed and Sealed this

First Day of November, 1994

Attest:

Attesting Officer

BRUCE LEHMAN

Commissioner of Patents and Trademarks